US012456483B2

(12) United States Patent
Sehlstedt

(10) Patent No.: US 12,456,483 B2
(45) **Date of Patent: *Oct. 28, 2025**

(54) METHOD AND DEVICE FOR VOICE ACTIVITY DETECTION

(71) Applicant: Telefonaktiebolaget LM Ericsson (publ), Stockholm (SE)

(72) Inventor: Martin Sehlstedt, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,361

(22) Filed: Dec. 14, 2023

(65) Prior Publication Data

US 2024/0119962 A1 Apr. 11, 2024

Related U.S. Application Data

(63) Continuation of application No. 17/876,017, filed on Jul. 28, 2022, now Pat. No. 11,900,962, which is a (Continued)

(51) Int. Cl.

*G10L 25/78* (2013.01)
*G10L 19/00* (2013.01)
*G10L 19/012* (2013.01)
*G10L 21/02* (2013.01)
*G10L 25/87* (2013.01)

(52) U.S. Cl.

CPC .............. *G10L 25/87* (2013.01); *G10L 19/00* (2013.01); *G10L 19/012* (2013.01); *G10L 21/02* (2013.01); *G10L 25/78* (2013.01)

(58) Field of Classification Search

CPC ....... G10L 25/87; G10L 19/00; G10L 19/012; G10L 21/02; G10L 25/78

See application file for complete search history.

(56) References Cited

U.S. PATENT DOCUMENTS 5,410,632 A * 4/1995 Hong ...................... G10L 25/78 704/201
6,088,670 A 7/2000 Takada
(Continued)

FOREIGN PATENT DOCUMENTS

CA 2 730 196 C 10/2014
CN 101681619 A 3/2010
(Continued)

OTHER PUBLICATIONS

International Search Report for International application No. PCT/SE2013/051020; Jun. 13, 2013.
(Continued)

*Primary Examiner* — Abul K Azad
(74) *Attorney, Agent, or Firm* — Baker Botts L.L.P.

(57) ABSTRACT

In accordance with an example embodiment of the present invention, disclosed is a method and an apparatus for voice activity detection (VAD). The VAD comprises creating a signal indicative of a primary VAD decision and determining hangover addition. The determination on hangover addition is made in dependence of a short term activity measure and/or a long term activity measure. A signal indicative of a final VAD decision is then created.

22 Claims, 6 Drawing Sheets

Related U.S. Application Data continuation of application No. 16/793,061, filed on Feb. 18, 2020, now Pat. No. 11,417,354, which is a continuation of application No. 16/002,074, filed on Jun. 7, 2018, now Pat. No. 10,607,633, which is a continuation of application No. 15/229,372, filed on Aug. 5, 2016, now Pat. No. 9,997,174, which is a continuation of application No. 14/424,223, filed as application No. PCT/SE2013/051020 on Aug. 30, 2013, now Pat. No. 9,472,208.

(60) Provisional application No. 61/695,623, filed on Aug. 31, 2012.

(56) References Cited

U.S. PATENT DOCUMENTS

| | | | | |
|---|---|---|---|---|
| 6,427,134 | B1 * | 7/2002 | Garner | G10L 25/78 704/226 |
| 6,453,289 | B1 | 9/2002 | Ertem | |
| 6,671,667 | B1 * | 12/2003 | Chandran | G10L 21/0208 704/226 |
| 8,321,217 | B2 | 11/2012 | Sehlstedt | |
| 9,472,208 | B2 | 10/2016 | Sehlstedt | |
| 9,997,174 | B2 | 6/2018 | Sehlstedt | |
| 10,607,633 | B2 | 3/2020 | Sehlstedt | |
| 11,417,354 | B2 | 8/2022 | Sehlstedt | |
| 2001/0014857 | A1 | 8/2001 | Wang | |
| 2002/0120440 | A1 | 8/2002 | Zhang | |
| 2004/0086109 | A1 | 5/2004 | Takada | |
| 2005/0267746 | A1 | 12/2005 | Jelinek | |
| 2007/0230493 | A1 | 10/2007 | Dravida et al. | |
| 2010/0211385 | A1 | 8/2010 | Sehlstedt | |
| 2011/0264449 | A1 | 10/2011 | Sehlstedt | |
| 2012/0209604 | A1 | 8/2012 | Sehlstedt | |
| 2012/0215536 | A1 * | 8/2012 | Sehlstedt | G10L 25/18 704/246 |
| 2015/0112689 | A1 | 4/2015 | Nandy | |

FOREIGN PATENT DOCUMENTS

| | | | |
|---|---|---|---|
| JP | 63281200 | A | 11/1988 |
| JP | 03141740 | A | 6/1991 |
| JP | H10-301600 | A | 11/1998 |
| JP | 3234044 | B2 | 12/2001 |
| JP | 2011-527445 | A | 10/2011 |
| KR | 20100069117 | A | 6/2010 |
| RU | 2 251 750 | C2 | 10/2005 |
| RU | 2 326 449 | C2 | 6/2008 |
| RU | 2 386 179 | C2 | 4/2010 |
| WO | 2004006226 | A1 | 1/2004 |
| WO | 2006107836 | A1 | 10/2006 |
| WO | 2011/049514 | A1 | 4/2011 |
| WO | 2011/049515 | A1 | 4/2011 |
| WO | 2012/083552 | A1 | 6/2012 |

OTHER PUBLICATIONS

PCT Written Opinion of the International Searching Authority for International application No. PCT/SE2013/051020; Jun. 13, 2013.

ITU-T; Telecommunication Standardization Sector of ITU; Series G: Transmission Systems and Media, Digital Systems and Networks; Digital Terminal Equipments—Coding of voice and audio signals; Frame error robust narrow-band and wideband embedded variable bit-rate coding of speech and audio from 8-32 kbits/s; Jun. 2008.

International Telecommunication Union; ITU-T Telecommunication Standardization Sector of ITU; G.718; Series G. Transmission Systems and Media, Digital Systems and Networks; Digital Terminal Equipments—Coding of voice and audio signals; Frame error robust narrow-band and wideband embedded variable bit-rate coding of speech and audio from 8-32 kbits/s (Due to size, this reference has been split into six parts.); Jun. 2008.

First Office Action received from the Japanese Patent Office for Japanese Patent Application No. 2015-529753 entitled "Method and Device for Voice Activity Detection"—May 20, 2016.

Official Action issued by the Russian Computer Technology Department for PCT Application No. SE2013/051020 of Aug. 30, 2013—Jun. 3, 2016.

State Intellectual Property Office of the People's Republic of China, First Office Action, Application No. 201380044957.X issuing date: Sep. 5, 2016, transmitted to Baker Botts; Nov. 21, 2016 (2 pages) Nov. 21, 2016.

Decision to Grant with Comments Translation, A Patent for Invention, Federal Service on Intellectual Property (ROSPATENT), Moscow, Russia, Application No. 2015111150.8 (Oct. 3, 2016).

Summary of the Office Action for Japanese Patent Application No. 2017-077712 dated Jun. 4, 2018.

First Office Action issued by the China National Intellectual Property Administration for Application No. 2017/10599104.2—Feb. 6, 2020.

Search Report issued by the Federal Service on Intellectual Property, Federal State Institute, "Federal Institute for Industrial Property" (FIIP), for Application No. 2018135681/28(058811) dated Nov. 25, 2021, 2 pages.

Government of India Patent Office, Examination Report under Sections 12 and 13 of the Patents Act, 1970 and the Patent Rules 2003, Indian Patent Application No. 202118005176 filed Jun. 2, 2021, 10 pages.

* cited by examiner

METHOD AND DEVICE FOR VOICE ACTIVITY DETECTION

PRIORITY

This application is a continuation, under 35 U.S.C. § 120, of U.S. patent application Ser. No. 17/876,017 filed on Jul. 28, 2022, which is a continuation, under 35 U.S.C. § 120, of U.S. patent application Ser. No. 16/793,061 filed on Feb. 18, 2020, now U.S. Pat. No. 11,417,354, which is a continuation, under 35 U.S.C. § 120, of U.S. patent application Ser. No. 16/002,074 filed on Jun. 7, 2018, now U.S. Pat. No. 10,607,633, which is a continuation, under 35 U.S.C. § 120, of U.S. patent application Ser. No. 15/229,372 filed on Aug. 5, 2016, now U.S. Pat. No. 9,997,174, which is a continuation, under 35 U.S.C. § 120, of U.S. patent application Ser. No. 14/424,223 filed on Feb. 26, 2015, now U.S. Pat. No. 9,472,208, which is a U.S. National Stage Filing under 35 U.S.C. § 371 of International Patent Application Serial No. PCT/SE2013/051020 filed on Aug. 30, 2013, and entitled "METHOD AND DEVICE FOR VOICE ACTIVITY DETECTION," which claims priority to U.S. Provisional Patent Application No. 61/695,623 filed Aug. 31, 2012, all of which are hereby incorporated by reference in their entirety.

TECHNICAL FIELD

The present disclosure relates in general to a method and device for voice activity detection (VAD).

BACKGROUND

In speech coding systems used for conversational speech it is common to use discontinuous transmission (DTX) to increase the efficiency of the encoding. The reason is that conversational speech contains large amounts of pauses embedded in the speech, e.g., while one person is talking the other one is listening. So with DTX the speech encoder is only active about 50 percent of the time on average and the rest can be encoded using comfort noise. Some example codecs that have this feature are the Adaptive Multi-Rate Narrow Band (AMR NB) and Enhanced Variable Rate Codec (EVRC). AMR NB uses DTX and EVRC uses variable bit rate (VBR), where a Rate Determination Algorithm (RDA) decides which data rate to use for each frame, based on a VAD decision. In DTX operation the speech active frames are coded using the codec while frames between active regions are replaced with comfort noise. Comfort noise parameters are estimated in the encoder and sent to the decoder using a reduced frame rate and a lower bit rate than the one used for the active speech.

For high quality DTX operation, i.e. without degraded speech quality, it is important to detect the periods of speech in the input signal. This is typically done by the Voice Activity Detector (VAD) (which is used in both for DTX and RDA). FIG. 1 shows an overview block diagram of an example of a generalized VAD 100, which takes the input signal 111, typically divided into data frames of 5-30 ms depending on the implementation, as input and produces VAD decisions as output, typically one decision for each frame. That is, a VAD decision is a decision for each frame whether the frame contains speech or noise.

The preliminary decision, vad_prim 113, is in this example made by the primary voice detector 101 and is in this example basically just a comparison of the features for the current frame and the background features (typically estimated from previous input frames), where a difference larger than a threshold causes an active primary decision. In other examples, the preliminary decision can be achieved in other ways, some of which are briefly discussed further below. The details of the internal operation of the primary voice detector is not of crucial importance for the present disclosure and any primary voice detector producing a preliminary decision will be useful in the present context. The hangover addition block 102 is in the present example used to extend the primary decision based on past primary decisions to form the final decision, vad_flag 115. The reason for using hangover is mainly to reduce/remove the risk of mid speech and backend clipping of speech bursts. However, the hangover can also be used to avoid clipping in music passages.

It is also possible to add additional hangover for the purpose of DTX. In FIG. 1 this has been illustrated by the optional output vad_flag_dtx 117. It should be noted that it is not uncommon that there is just one output vad_flag but that the hangover logic uses other settings when the output is to be used for DTX. In this description, the two final decision outputs vad_flag 115 and vad_flag_dtx 117 will be separated in most embodiments, in order to simplify the description. However, solutions based on alternative hangover settings and one single output are also applicable.

There are two main reasons for using different final decision outputs or hangover setting depending on whether the VAD decision is used for DTX or not. First, from a speech quality point of view there are higher requirements on the VAD when it is used for DTX. Therefore it is desirable to make sure that the speech has ended before switching to comfort noise. The second motivation is that the additional hangover can be used for estimation of the characteristics of background noise. For example in AMR NB the first comfort noise estimate is done in the decoder based on the specific DTX hangover used.

As mentioned before, there are a number of different features that can be used for VAD detection. One possible feature is to look just at the frame energy and compare this with a threshold to decide if the frame contains speech or not. This scheme works reasonably well for conditions where the Signal-to-Noise Ratio (SNR) is good but not for low SNR cases. In low SNR other metrics are preferably used, e.g., comparing the characteristics of the speech and the noise signals. For real-time implementations, an additional requirement on VAD functionality is computational complexity, which is reflected in the frequent representation of sub-band SNR VADs in standard codecs. The sub-band VAD typically combines the SNRs of the different sub-bands to a common metric which is compared to a threshold for the primary decision.

The VAD 100 comprises a feature extractor 106 providing the feature sub-band energy, and a background estimator 105, which provides sub-band energy estimates. For each frame, the VAD 100 calculates features. To identify active frames, the feature(s) for the current frame are compared with an estimate of how the feature "looks" for the background signal.

The hangover addition block 102 is used to extend the VAD decision from the primary VAD based on past primary decisions to form the final VAD decision, "vad_flag", i.e. older VAD decisions are also taken into account. As mentioned before, the reason for using hangover is mainly to reduce/remove the risk of mid speech and backend clipping of speech bursts. However, the hangover can also be used to avoid clipping in music passages. An operation controller 107 may adjust the threshold (s) for the primary detector and the length of the hangover addition according to the characteristics of the input signal.

There are also known solutions where multiple features with different characteristics are used for the primary decision. For VADs based on the sub-band SNR principle, it has been shown that the introduction of a non-linearity in the sub-band SNR calculation, sometimes referred to as significance thresholds, can improve VAD performance for conditions with non-stationary noise, e.g., babble or office noise. However, in these cases there is typically one primary decision that is used for adding hangover, which may be adaptive to the input signal conditions, to form the final decision. Also, many VADs have an input energy threshold for silence detection, i.e., for low enough input levels the primary decision is forced to the inactive state.

One example where significance thresholds were used to create a dual VAD solution is described in the published International patent application WO2008/143569 A1. In this case, the dual VADs were used to improve background noise update and music detection. However, only an aggressive primary VAD was used for the final vad_flag decision.

In WO2008/143569 A1, a metric based on a low-pass filtered short term activity was used for detecting the existence of music. This low-pass filtered metric provides a slowly varying quantity, suitable for finding more or less continuous types of sound, typical for e.g. music. An additional vad_music decision may then be provided to the hangover addition, making it possible to treat music sound in a particular manner.

There are several different ways to generate multiple primary VAD decisions. The most basic would be to use the same features as the original VAD but achieve a second primary decision using a second threshold. Another option is to switch VAD according to estimated SNR conditions, e.g., by using energy for high SNR conditions and switching to sub-band SNR operation for medium and low SNR conditions.

In the published International patent application WO2011/049516 A1, a voice activity detector and a method therefore are disclosed. The voice activity detector is configured to detect voice activity in a received input signal. The VAD comprises a combination logics configured to receive a signal from a primary voice detector of the VAD indicative of a primary VAD decision. The combination logics further receives at least one signal from an external VAD indicative of a voice activity decision from an external VAD. A processor combines the voice activity decisions indicated in the received signals to generate a modified primary VAD decision. The modified VAD decision is sent to a hangover addition unit.

One problem with hangover is to decide when and how much to use. From a speech quality point of view, addition of hangover is basically positive. However, it is not desirable to add too much hangover since any additional hangover will reduce the efficiency of the DTX solution. As it is not desirable to add hangover to every short burst of activity, there is usually a requirement of having a minimum number of active frames from the primary detector vad_prim before considering the addition of some hangover to create the final decision vad_flag. However, to avoid clipping in the speech it is desirable to keep this required number of active frames as low as possible.

For non-stationary noise a low number of required active frames might allow the noise itself to cause long enough VAD events that will trigger the addition of hangover. So in order to avoid excessive activity, such a solution does usually not allow for long hangovers.

Another problem with a required number of active frames before adding hangover for a high efficient VAD is its ability to detect the short pauses within an utterance. In this case, there is an utterance that has been detected correctly, but the speaker makes a slight pause before continuing. This causes the VAD to detect the pause and once more requires a new period of active primary frames before any hangover at all is added. This can cause annoying artifacts with back end clipping of trailing speech segments such as utterances ending with unvoiced explosives.

SUMMARY

An object of the embodiments of the invention is to address at least one of the issues outlined above, and this object is achieved by the methods and the apparatuses according to the appended independent claims, and by the embodiments according to the dependent claims.

According to one aspect of the invention, a method is provided for voice activity detection (VAD) comprising creation of a signal indicative of a primary VAD decision, and determining whether a hangover addition of the primary VAD decision is to be performed. The determination on hangover addition is made in dependence of a short term activity measure and/or a long term activity measure. A signal indicative of a final VAD decision is then created depending at least on the hangover addition determination.

In one embodiment, the short term activity measure is deduced from the N_st latest primary VAD decisions.

In one embodiment, the long term activity measure is deduced from the N_lt latest final VAD decisions or from N_lt latest primary VAD decisions.

In one embodiment, two versions of final decisions, a first final VAD decision and a second final VAD decision are created. The second final VAD decision may be made without use of the short term activity measure and/or the long term activity measure, and the long term activity measure may be deduced from N_lt latest second final VAD decisions.

In one embodiment, a final VAD decision is equal to the primary VAD decision if a hangover addition is determined not to be performed. In case a hangover addition is determined to be performed, a final VAD decision is equal to a voice activity decision, indicating an active frame.

According to another aspect of the invention, an apparatus for voice activity detection is provided. The apparatus comprises an input section, a primary voice detector arrangement and a hangover addition unit. The input section is configured for receiving an input signal. The primary voice detector arrangement is connected to the input section. The primary voice detector arrangement is configured for detecting voice activity in the received input signal and for creating a signal indicative of a primary VAD decision associated with the received input signal. The hangover addition unit is connected to the primary voice detector arrangement. The hangover addition unit is configured for determining whether a hangover addition of the primary VAD decision is to be performed, and for creating a signal indicative of a final VAD decision at least partly depending on a hangover addition determination. The apparatus further comprises a short term activity estimator and/or a long term activity estimator. The short term activity estimator is connected to an input of the hangover addition unit. The long term activity estimator is connected to an output of the hangover addition unit. The hangover addition unit is connected to an output of the short term activity estimator and/or the long term activity estimator. The hangover addition unit is further configured for performing the hangover determination in dependence of the short term activity measure and/or the long term activity measure.

In one embodiment, the short term activity estimator is configured for deducing a short term activity measure from the N_st latest primary VAD decisions.

In one embodiment, the long term activity estimator is configured for deducing a long term activity measure from the N_lt latest final VAD decisions or from the N_lt latest primary VAD decisions.

In one embodiment, an apparatus is provided. This embodiment is based on a processor, for example a micro processor, which executes a software component for creating a signal indicative of a primary VAD decision, a software component for determining whether a hangover addition of the primary VAD decision is to be performed, and a software component for creating a signal indicative of a final VAD decision at least partly depending on a hangover addition determination. In this embodiment the processor executes a software component for deducing a short term activity measure from the N_st latest primary VAD decisions and/or a software component for deducing a long term activity measure from the N_lt latest final VAD decisions. These software components are stored in a memory.

According to another aspect of the invention, a computer program is provided. The computer program comprises computer readable code units which when run on an apparatus causes the apparatus to create a signal indicative of a primary VAD decision, to determine whether a hangover addition of the primary VAD decision is to be performed based on at least one of: a short term activity measure and a long term activity measure, and to create a signal indicative of a final VAD decision at least partly depending on a hangover addition determination.

According to another aspect of the invention, a computer program product is provided. The computer program product comprises computer readable medium and a computer program for creating a signal indicative of a primary VAD decision, determining whether a hangover addition of the primary VAD decision is to be performed based on at least one of: a short term activity measure and a long term activity measure, and creating a signal indicative of a final VAD decision at least partly depending on a hangover addition determination, is stored on the computer readable medium.

BRIEF DESCRIPTION OF THE DRAWINGS

For a more complete understanding of example embodiments of the present invention, reference is now made to the following description taken in connection with the accompanying drawings in which.

DETAILED DESCRIPTION

One way to mitigate such problems has now been found to be to use the temporal characteristics of the primary detector metrics and the final decision metrics. These have been found to be well suited for adjusting the additional hangover. At least one of the primary decision inputted into the hangover addition and the final decision outputted from the hangover addition is preferably used for influencing the hangover addition, and most preferably both are used. The primary decision inputted into the hangover addition can be the original primary decision obtained from a primary voice detector, or it can be a modified version of such an original primary decision. Such a modification may be performed based on outputs from other VADs.

Figure 1:
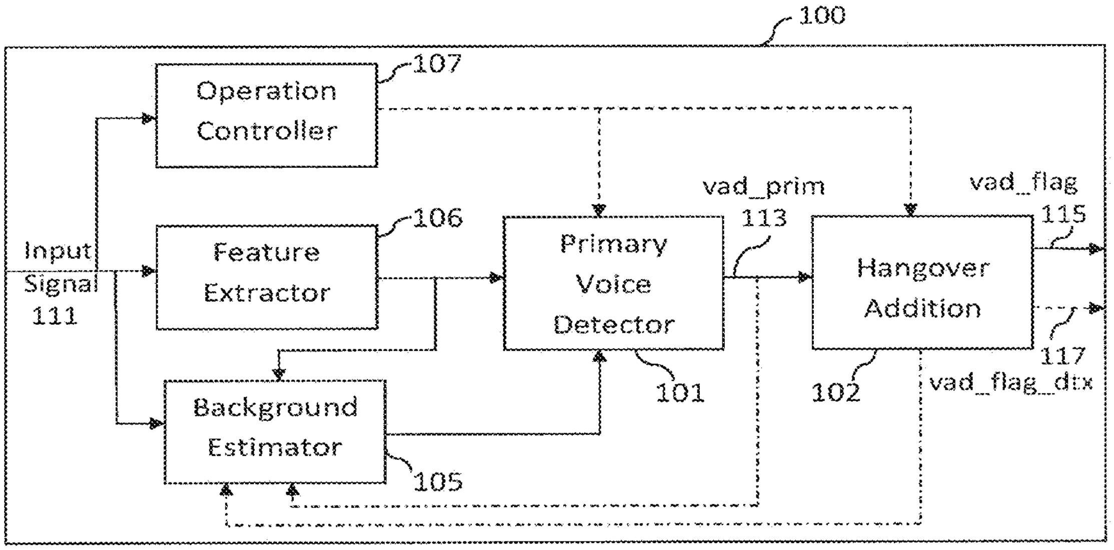
FIGURE 1 (Prior Art)
FIG. 1 shows an example of a generic VAD with background estimation.
Figure 2:
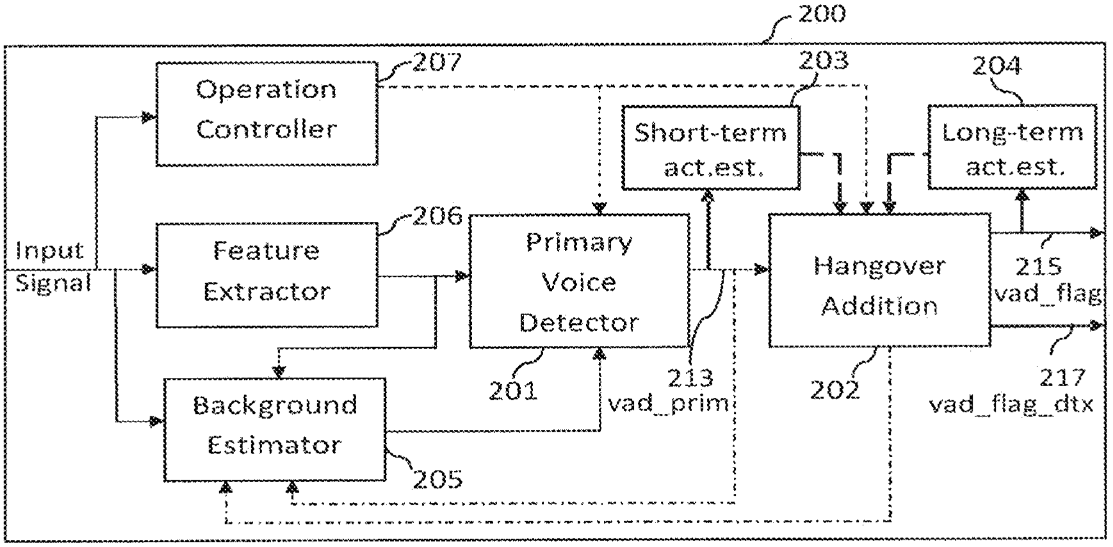
FIG. 2 illustrates an example embodiment of a VAD according to the invention.

One embodiment of a generic type of VAD 200 making use of the primary decision inputted into the hangover addition 202 and the final decision outputted from the hangover addition 202 is illustrated in FIG. 2. A feature extractor 206 provides the feature sub-band energy, a background estimator 205 provides sub-band energy estimates, an operation controller 207 may adjust the threshold(s) for the primary detector and the length of the hangover addition according to the characteristics of the input signal, and a primary voice detector 201 makes the preliminary decision vad_prim 213 as described in connection to FIG. 1.

In this embodiment, the voice activity detector 200 further comprises a short term activity estimator 203 and/or a long term activity estimator 204. The temporal characteristics are captured using the features short term activity of the primary decision, vad_prim 213, and the long term activity of the final decision, vad_flag 215. These metrics are then used to adjust the hangover addition to improve the VAD performance for use in DTX by creating an alternate final decision, vad_flag_dtx 217.

Here, in this case, short term activity is measured by counting the number of active frames in a memory of the latest N_st primary decisions vad_prim 213. Similarly the long term activity is measured by counting the number of active frames in the final decision vad_flag 215 in the latest N_lt frames. N_lt is larger than N_st, preferably considerably larger. These metrics are then used to create the alternate final decision vad_flag_dtx 217. The advantage of using these metrics is that it simplifies the tuning of hangover as it is easier to add hangover at just the times when the activity is already high.

A high short term activity indicates either the beginning, the middle or the end of an active burst. At a first glance this metric may appear similar to the commonly used way of just requiring a number of consecutive active frames as mentioned earlier. However, the main difference is that the short term activity is not reset when a non-activity decision appears. Instead, it has a memory that remembers an active frame for up to N_st frames before it eventually is dropped from memory. A non-active frame will therefore only reduce the average short term activity somewhat. For a sufficiently high short term activity it would be safe to add a few frames of hangover, as the short term activity already is high the additional hangover will only have a small effect on the total activity. Scattered non-activity frames will not reduce the short term activity enough for interrupting such hangover operation.

Scattered non-activity frames may correspond to short pauses in the middle of an utterance or may be a false non-activity detection, e.g., caused by short sequences of unvoiced speech. By utilizing the short term activity in the way indicated above, hangover addition can be maintained during such occasions.

Similarly a high long term activity indicates that the speech burst has been active for some time. If the long term activity is high it is thus with a large probability possible to add several additional hangover frames and still only have a small effect on the total activity.

In one embodiment, the short term activity and the long term activity, respectively, is compared with a respective predetermined threshold. If the respective threshold is reached, a predetermined respective number of hangover frames are added.

Since the long term activity reacts relatively slow in dependence of an actual end of a speech activity, there is a risk that a high number of added hangover frames are utilized a relative long time after the end of the speech burst. To this end, it is also possible to use a low short term activity as an indication of the end of a speech burst. It might therefore be desirable in one embodiment to limit the amount of additional hangover if the short term activity falls below a predetermined threshold.

In other words, a sufficiently low short term activity may override the addition of hangover frames as indicated by a simultaneously high long term activity.

Below, the embodiments above are in most cases described as modifications of existing solutions where the increase in complexity is small. However, it is also possible to design a completely new VAD which is to use the above metrics to provide a more reliable VAD decision.

Figure 3:
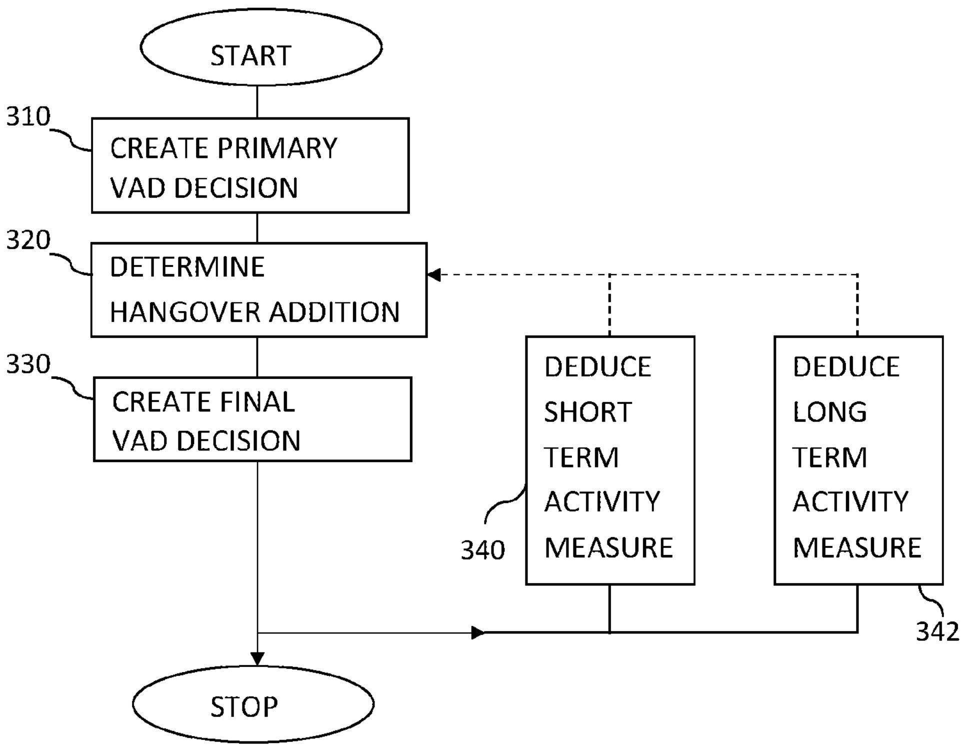
FIG. 3 is a flow chart illustrating an example VAD method according to an embodiment of the invention.

In one embodiment, schematically illustrated in FIG. 3, a method in a voice activity detector for detecting voice activity in a received input signal comprises creation 310 of a signal indicative of a primary VAD decision associated with the received input signal, preferably by analyzing characteristics of the received input signal. It is determined 320 whether or not a hangover addition of the primary VAD decision is to be performed. A signal indicative of a final VAD decision is created 330. A final VAD decision is equal to the primary VAD decision if a hangover addition is determined not to be performed. A final VAD decision is equal to a voice activity decision if a hangover addition is determined to be performed. Since hangover is added, the voice activity decision is set to indicate active frame, i.e. a frame containing speech rather than noise. A short term activity measure is deduced 340 from the N_st latest primary VAD decisions and/or a long term activity measure is deduced 342 from the N_lt latest final VAD decisions. The determination on whether or not a hangover addition is to be performed is made in dependence of the short term activity measure and/or the long term activity measure. Even if the FIG. 3 is illustrated as a single flow of events, the actual system will treat one frame after the other. The broken arrows indicate that the dependence of the short term activity measure and/or the long term activity measure is valid for a subsequent frame.

It should be understood that FIG. 3 does not illustrate a signal flow but rather method steps to be performed according to an embodiment of the invention. That is, creating a final VAD decision 330 may comprise creating an alternate final decision (e.g. vad_flag_dtx 217) based on short term activity and/or long term activity measures. The alternate final decision is, however, not used as an input for the long term activity estimator 204 as it would introduce a feedback loop of activity (due to modification of the feature to be measured with adjusted hangover addition). Therefore, creating a final VAD decision 330 may also comprise creating a final decision (e.g. vad_flag 215) based on traditional hangover technique and/or the short term activity measures but not the long term activity measures, which is then used as an input for the long term activity estimator 204, as shown in FIG. 2.

Figure 4A:
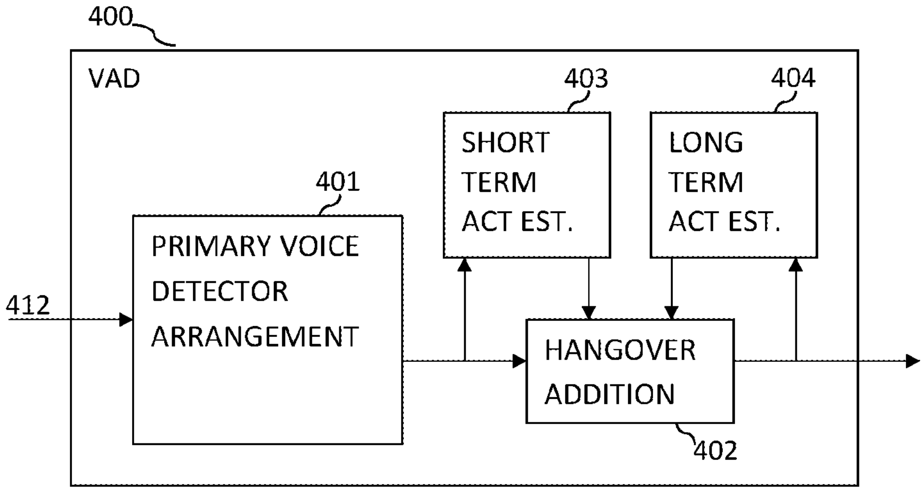
FIG. 4A illustrates one example embodiment of a VAD according to the invention.

In one embodiment, schematically illustrated in FIG. 4A, a voice activity detector 400 comprises an input section 412, a primary voice detector arrangement 401 and a hangover addition unit 402. The input section is configured for receiving an input signal. The primary voice detector arrangement 401 is connected to the input section 412. The primary voice detector arrangement 401 is configured for detecting voice activity in the received input signal and for creating a signal indicative of a primary VAD decision associated with the received input signal. The hangover addition unit 402 is connected to the primary voice detector arrangement 401. The hangover addition unit 402 is configured for determining whether or not a hangover addition of said primary VAD decision is to be performed and for creating a signal indicative of a final VAD decision. The final VAD decision is equal to the primary VAD decision if a hangover addition is determined not to be performed. The final VAD decision is equal to a voice activity decision if a hangover addition is determined to be performed. The voice activity detector 400 further comprises a short term activity estimator 403 and/or a long term activity estimator 404. The short term activity estimator 403 is connected to an input of the hangover addition unit 402. The short term activity estimator 403 is configured for deducing a short term activity measure from the N_st latest primary VAD decisions. The long term activity estimator 404 is connected to an output of the hangover addition unit 402. The long term activity estimator 404 is configured for deducing a long term activity measure from the N_lt latest final VAD decisions. The hangover addition unit 402 is connected to an output of the short term activity estimator 403 and/or the long term activity estimator 404. The hangover addition unit 402 is further configured for performing the hangover determination in dependence of the short term activity measure and/or the long term activity measure. The hangover determination depending on the short term activity measure and/or the long term activity measure may then be used to adjust the hangover addition to improve the VAD performance for use in DTX by creating an alternate final decision.

The voice activity detector is typically provided in a voice or sound codec. Such codec's are typically provided in different end devices, e.g. in telecommunication networks. Non-limiting examples are telephones, computers, etc. where detection or recordings of sound is performed.

Figure 4B:
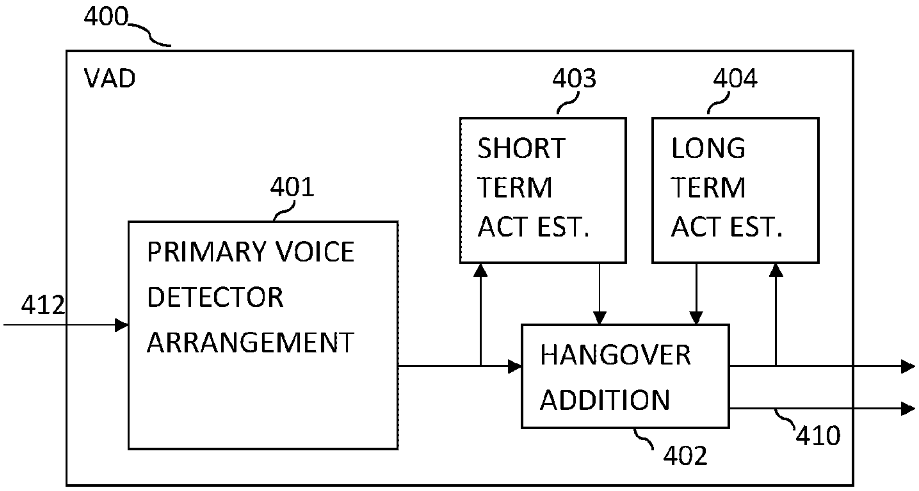
FIG. 4B illustrates another example embodiment of a VAD according to the invention.

In one embodiment, the final VAD decision is given as an additional flag 410, besides the final VAD decision made without use of the short term activity measures or long term activity measures, typically as a final VAD decision for DTX use, as illustrated in FIG. 4B. The two versions of final decisions can then be used in parallel by different units or functionalities. In another alternative embodiment, the use of the short term activity measures or long term activity measures can be switched on and off depending on the context in which the VAD decision is going to be used.

Figure 4C:
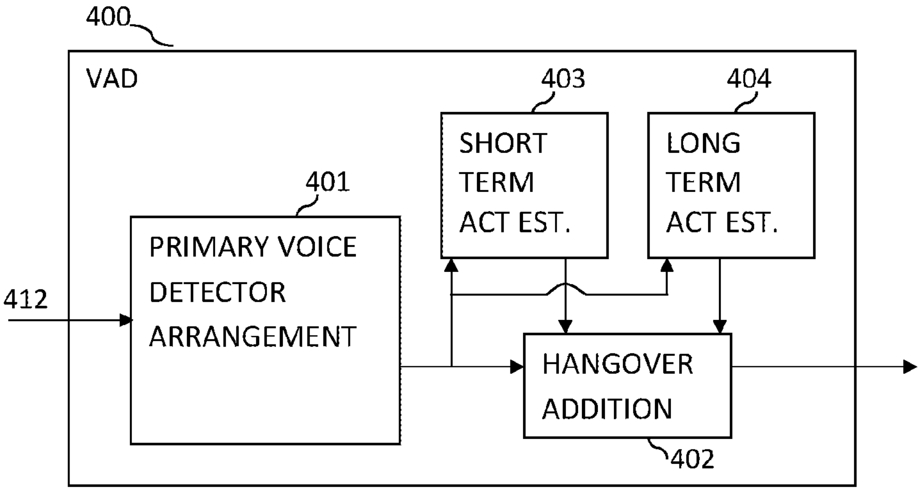
FIG. 4C illustrates still another example embodiment of a VAD according to the invention.

In another embodiment, where a final VAD decision is not available or not suitable for making any long term activity analysis on, a long term activity analysis could instead be performed on the primary VAD decision. In such an embodiment, the long term activity estimator 404 is instead connected to the input of the hangover addition unit 402, as shown in FIG. 4C, and a long term activity measure is deduced from the N_lt latest primary VAD decisions.

In yet another embodiment, the estimations of the short and long term activity could be performed on primary and/or final VAD decision different from the primary and/or final VAD decision on which the hangover addition adjustment is to be performed. One possibility is to have a simple VAD producing a primary VAD decision and a simple hangover unit modifying it into a final VAD decision. The short and long term activity behavior of such primary and/or final VAD decisions can then be analyzed. However, another VAD setup, for instance a more sophisticated one, can then be used for providing the primary VAD decision of interest for adjustment of hangover addition. The analyzed activities from the simple system can then be utilized for controlling the operation of the hangover addition unit 402 of the more elaborate VAD system, giving a reliable final VAD decision.

Figure 5:
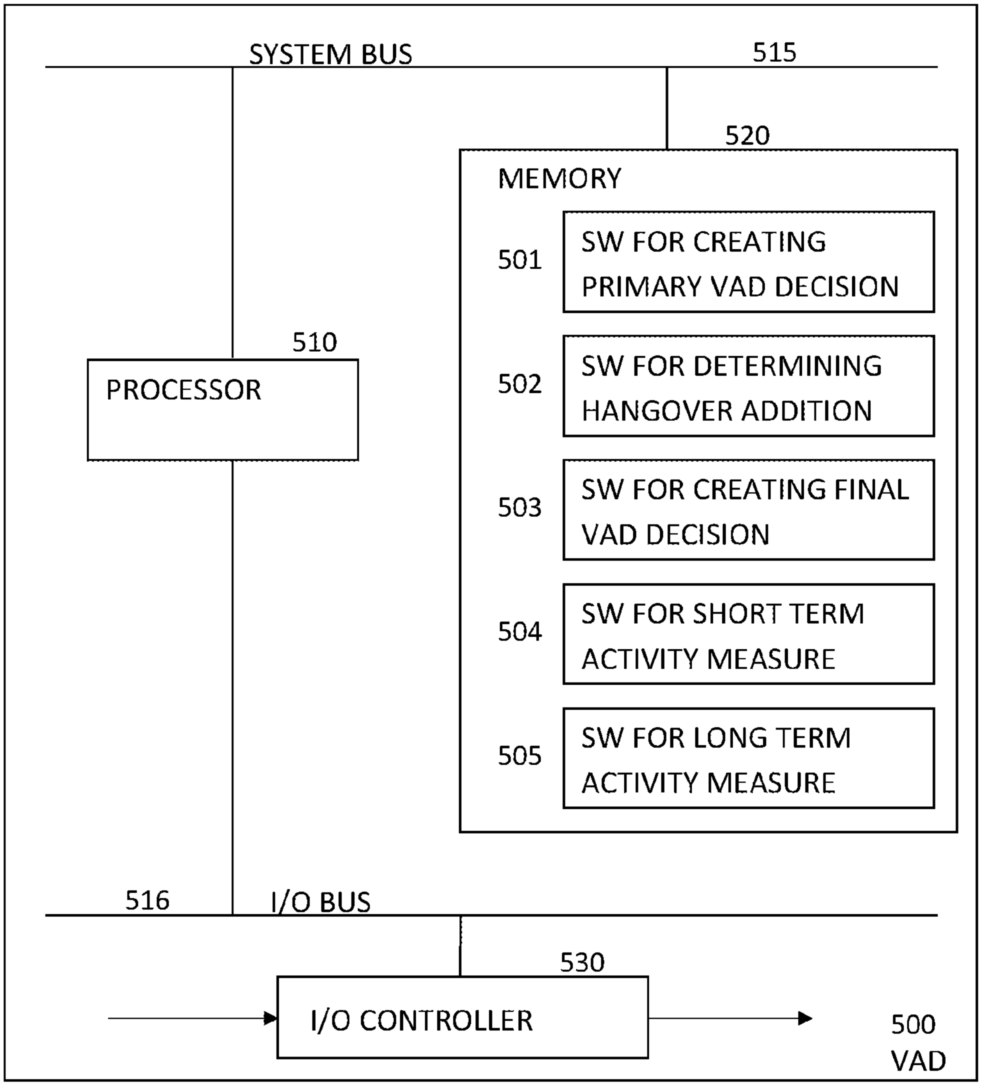
FIG. 5 illustrates a further example embodiment of a VAD according to the invention.

In the following, an example of an embodiment of voice activity detector 500 will be described with reference to FIG. 5. This embodiment is based on a processor 510, for example a micro processor, which executes a software component 501 for creating a signal indicative of a primary VAD decision, a software component 502 for determining whether a hangover addition of the primary VAD decision is to be performed, and a software component 503 for creating a signal indicative of a final VAD decision. In this embodiment the processor 510 executes a software component 504 for deducing a short term activity measure from the N_st latest primary VAD decisions and/or a software component 505 for deducing a long term activity measure from the N_lt latest final VAD decisions. These software components are stored in a memory 520. The processor 510 communicates with the memory 520 over a system bus 515. The audio signal is received by an input/output (I/O) controller 530 controlling an I/O bus 516, to which the processor 510 and the memory 520 are connected. In this embodiment, the signals received by the I/O controller 530 are stored in the memory 520, where they are processed by the software components. Software component 501 may implement the functionality of step 310 in the embodiment described with reference to FIG. 3 above. Software component 502 may implement the functionality of step 320 in the embodiment described with reference to FIG. 3 above. Software component 503 may implement the functionality of step 330 in the embodiment described with reference to FIG. 3 above. Software component 504 may implement the functionality of step 340 in the embodiment described with reference to FIG. 3 above. Software component 505 may implement the functionality of step 342 in the embodiment described with reference to FIG. 3 above. The I/O unit 530 may be interconnected to the processor 510 and/or the memory 520 via an I/O bus 516 to enable input and/or output of relevant data such input signals and final VAD decisions.

In one embodiment, counters of active frames in the memory of primary decisions and final decisions are used as described above. In alternative embodiments, it would also be possible to use weighting that depends on the age of the active frame in memory. This is possible for both the short term primary activity and the long term final decision activity. In further embodiments, it could be possible to use different additional hangovers depending on other input signal characteristics, such as estimated Speech Level, Noise Level, and/or SNR.

In further embodiments, it could be of interest to use more than the two temporal characteristics to better locate the beginning, middle, or end of an active speech burst.

In further embodiments, the hangover decisions principles described above could also be combined with other VAD improvement solutions such as the principles of the Multi VAD combiner presented in WO2011/049516. In this case the modified primary VAD decision as input to the short term activity estimator and the hangover addition block may be used. The Multi VAD combiner could then be considered to be a part of the primary voice detector arrangement.

Similarly, different additional approaches for estimating the background can advantageously and easily be integrated with the present ideas. A G.718 codec according to 3GPP2 standards is used as the basis for an embodiment presented here below. A detailed description of the related parts can be found in e.g. the published International patent application WO2009/000073 A1.

Figure 6:
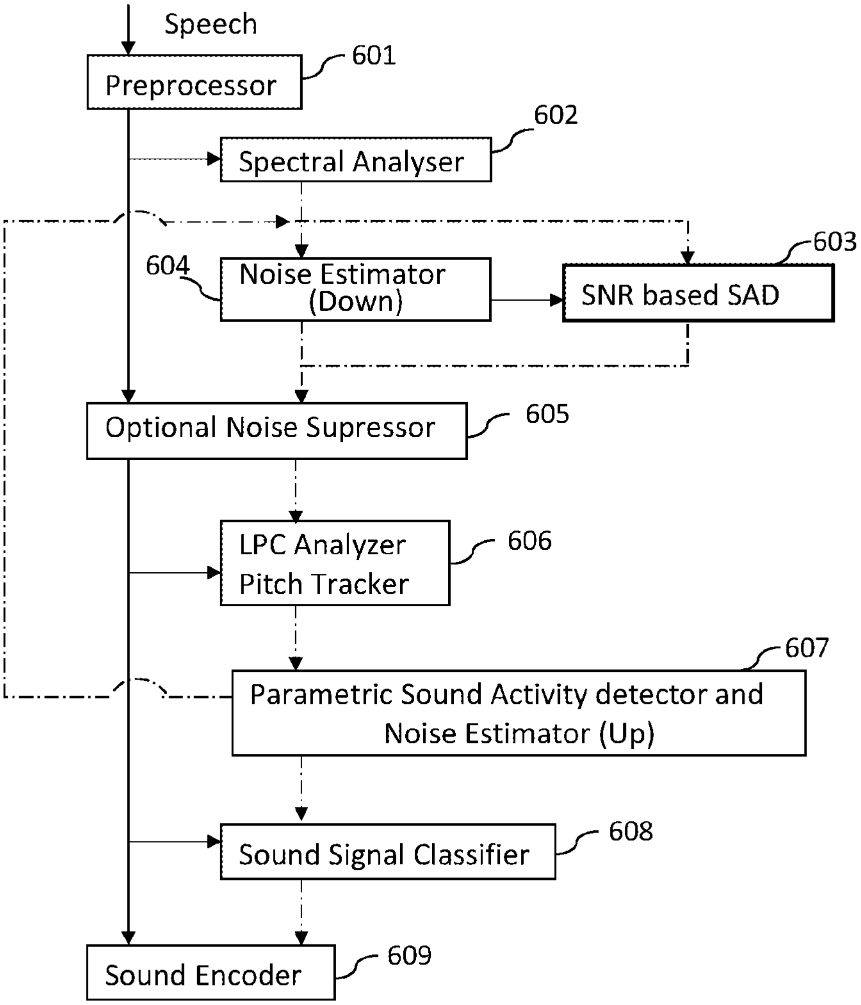
FIG. 6 shows an embodiment of a VAD with hangover.

FIG. 6 shows a block diagram of a sound communication system of WO2009/000073 A1 comprising a pre-processor 601, a spectral analyzer 602, a sound activity detector 603, a noise estimator 604, an optional noise reducer 605, a LP analyzer and pitch tracker 606, a noise energy estimate update module 607, a signal classifier 608 and a sound encoder 609. Sound activity detection (first stage of signal classification) is performed in the sound activity detector 603 using noise energy estimates calculated in the previous frame. The output of the sound activity detector 603 is a binary variable which is further used by the encoder 609 and which determines whether the current frame is encoded as active or inactive.

The module "SNR Based SAD" 603 is the module where the embodiments of the present disclosure may be implemented. Currently, the presented embodiment only covers the wideband signal chain, sampled at 16 kHz, but a similar modification would also be beneficial for the narrowband signal chain, sampled at 8 kHz, or any other sampling rates.

In an embodiment, based on the principles presented in WO2011/049516 A1, the original VAD from WO2009/000073 A1 (VAD 1) is used as the first VAD, generating the signals localVAD and vad_flag. This localVAD is in the present disclosure used as VAD_prim 213 on which the short term activity estimation is made.

Figure 7:
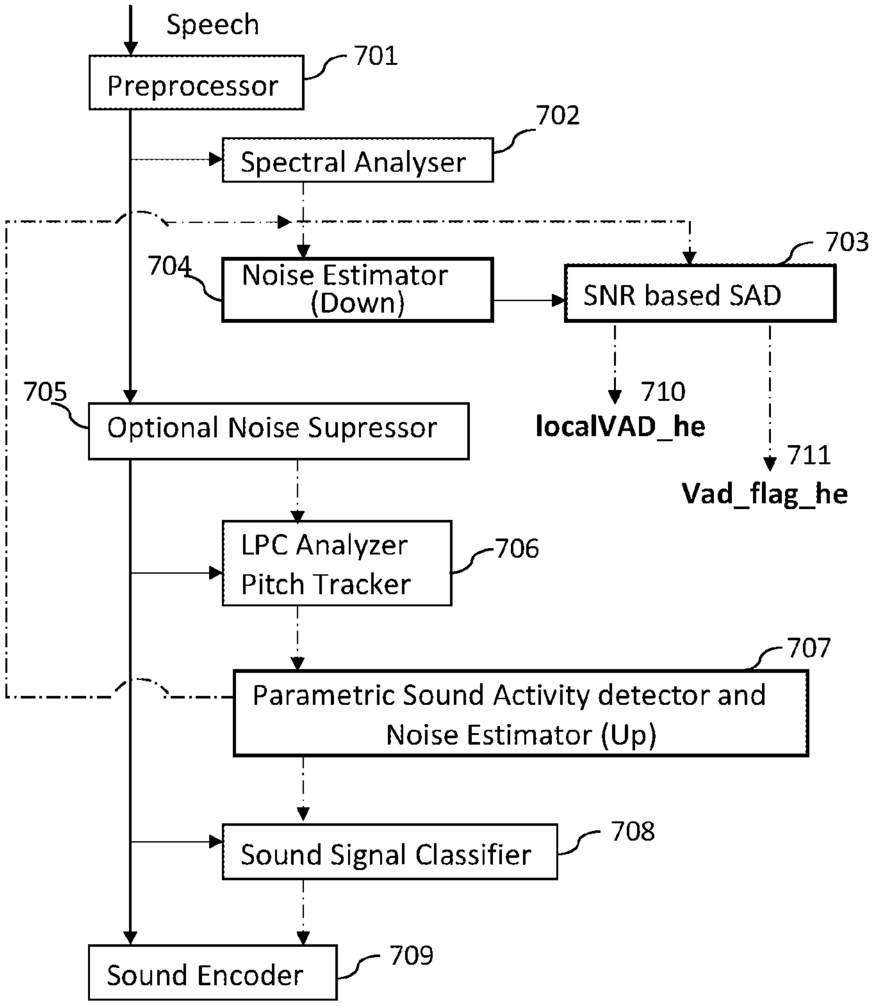
FIG. 7 shows an embodiment of an additional VAD.

The additional VAD (VAD 2) is also based on WO2009/000073 A1 but is achieved by using modifications for background noise estimation and SNR based SAD. FIG. 7 shows a block diagram for the second VAD. The block diagram shows a pre-processor 701, a spectral analyzer 702, an "SNR Based SAD" module 703, a noise estimator 704, an optional noise reducer 705, a LP analyzer and pitch tracker 706, a noise energy estimate update module 707, a signal classifier 708 and a sound encoder 709.

The block diagram also shows the primary and final VAD decisions for VAD 2, localVAD_he 710 and vad_flag_he 711, respectively. The localVAD_he 710 and vad_flag_he 711 are used in the primary voice detector of the VAD 1 for producing the localVAD.

For this embodiment the following variables are added to the encoder state (Encoder_State):

```
long long vad_flag_reg;     /* memory of old vad_flag */
long long vad_prim_reg;     /* memory of old localVAD */
short vad_flag_cnt_50;      /* counter of vad_flag active frames */
short vad_prim_cnt_16;      /* counter of primary active frames */
short hangover_cnt_dtx;     /* counter of hangover frames for DTX */
```

All these states should be set to zero during initialization, e.g. it could be done in the routine wb_vad_init( ).

Further, the features short term and long term activity are updated, which should be done at the end of the processing for each frame. It can be done by adding the following code in the suitable source file:

```
if ((st->vad_flag_reg & (long long) 0x01LL << 49) != 0)
(
   st->vad_flag_cnt_50=st->vad_flag_cnt_50-1;
)
st->vad_flag_reg = (st->vad_flag_reg & (long long)
0x3fffffffffffffLL ) << 1;
if (vad_flag)
(
   st->vad_flag_reg = st->vad_flag_reg | 0x01L;
   st->vad_flag_cnt_50 = st->vad_flag_cnt_50+1;
)
if ((st->vad_prim_reg & (long long) 1LL << 15) != 0)
(
   st->vad_prim_cnt_16=st->vad_prim_cnt_16-1;
)
st->vad_prim_reg = (st->vad_prim_reg & (long long)
0x3fffffffffffffLL ) << 1;
if (localVAD)
(
   st->vad_prim_reg = st->vad_prim_reg | 0x01L;
   st->vad_prim_cnt_16 = st->vad_prim_cnt_16+1;
)
```

Here the variable st references to the allocated Encoder_State variable in the encoder. So for the following frame the state variables st→vad_flag_cnt_50 will contain the long term final decision activity in the form of number of frames that are active within the latest 50 frames and the state variable st→vad_prim_cnt_16 will contain the short term primary activity in the form of the number of primary active frames within the latest 16 frames. The length of the memory of the short term activity, 16 frames, and the length of the memory of the long term activity, 50 frames, are values used in this particular embodiment. These figures are typical values that may be used in an operable implementation, but the absolute values are not crucial. These numbers may therefore be adapted in different types of implementations, e.g., as a tuning of the hangover properties. Generally, the length of the memory of the long term activity is longer than the length of the memory of the short term activity, and preferably considerably longer, as in the above presented example. In a typical embodiment, the ratio between the length of the memory of the long term activity and the length of the memory of the short term activity is within the range of 2.5 to 5. Also this ratio can be adapted for different types of implementations where different types of sound are expected to be frequently present.

The code for deciding how much hangover, hangover_short, should be added can be implemented using the following code modification where:

```
lp_snr      is an lowpass filtered SNR estimate
th_clean    SNR Threshold use for deciding if the input is clean speech
thr1        the calculated threshold for the primary detector
  if( lp_snr < th_clean )
  (
     thr1 = nk * lp_snr + nc;   /* Linear function for noisy speech */
     if( st->Opt_SC_VBR )
     (
        hangover_short = 1;
     )
```

-continued

```
     else
     (
        hangover_short = 4;
     )
  )
  else
  (
     thr1 = sk * lp_snr + sc;   /* Linear function for clean speech */
     hangover_short = 1;
  )
```

To the following which then adds the code needed for the adaptation of the hangover used for DTX hangover_short_dtx.

```
if( lp_snr < th_clean )
(
   thr1 = nk * lp_snr + nc;   /* Linear function for noisy speech */
   if( st->Opt_SC_VBR )
   (
      hangover_short = 1;
   )
   else
   (
      hangover_short = 4;
   )
)
else
(
   thr1 = sk * lp_snr + sc;   /* Linear function for clean speech */
   hangover_short = 1;
)
hangover_short_dtx = hangover_short; /* start with same hangover for
DTX */
if (st->Opt_DTX_ON)
(
   if (st->vad_prim_cnt_16 > 12 ) /* 12 requires roughtly > 80%
primary activity */
   (
      hangover_short_dtx = hangover_short_dtx + 1;
   )
   if (st->vad_flag_cnt_50 > 40 ) /* 40 requires roughtly > 80% flag
activity */
   (
      hangover_short_dtx = hangover_short_dtx + 3;
   )
   /* Keep hangover_short lower than maximum hangover count */
   if (hangover_short_dtx > HANGOVER_LONG-1)
   (
      hangover_short_dtx=HANGOVER_LONG-1;
   )
   /* Only allow short HO if not sufficient active frames */
   if ( st->vad_prim_cnt_16 < 7 && hangover_short_dtx > 4 )
   (
      hangover_short_dtx=4;
   )
)
```

Also here, there are a number of specified figures, which are to be considered as design variables. These numbers may therefore also be adapted in different types of implementations, e.g. as a tuning of the hangover properties.

The code for implementing the actual hangover can be done with the following modification:

```
flag                  The final VAD decision including hangover
localVAD              primary decision
snr_sum               VAD feature in the form of a sub band SNR estimate
st->nb_active_frames  Number of consecutive active frames (primary
                      decisions)
st->hangover_cnt      Counter for hangover frames used
   flag = 0;
```

-continued

```
*localVAD = 0;
if ( snr_sum > thr1 && ( st->Opt_HE_SAD_ON == 0 || (flag_he == 1 &&
flag_he1 == 1) ) ) /* Speech present */
(
   flag = 1;
   if ( snr_sum > thr1 )
   (
      *localVAD = 1;   /* VAD without hangover */
   )
   st->nb_active_frames++;   /* Counter of consecutive active speech
frames */
   if ( st->nb_active_frames >= ACTIVE_FRAMES )
   (
      st->nb_active_frames = ACTIVE_FRAMES;
      st->hangover_cnt = 0;   /* Reset the counter of hangover
frames after at least "active_frames" speech frames */
   )
   /* inside HO period */
   if( st->hangover_cnt < HANGOVER_LONG && st->hangover_cnt != 0 )
   (
      st->hangover_cnt++;
   )
)
else
( /* Reset the counter of speech frames necessary to start hangover
algorithm */
   st->nb_active_frames = 0;
   if( st->hangover_cnt < HANGOVER_LONG )   /* inside HO period */
   (
      st->hangover_cnt++;
   )
   if( st->hangover_cnt <= hangover_short )    /* "hard" hangover */
   (
      flag = 1 ;
   )
```

This is modified to the following to include the new VAD decision to be used for DTX, vad_flag_dtx. Using the above defined DTX hangover adaptation, hangover_short_dtx. Which adds the following variables:

| | |
|---|---|
| flag_dtx | Final VAD decision which also includes DTX specific hangover |
| st->hangover_cnt_dtx | Counter for number of hangover frames used for DTX |

```
flag = 0;
flag_dtx = 0;
*localVAD = 0;
if ( snr_sum > thr1 && ( st->Opt_HE_SAD_ON == 0 || (flag_he == 1 &&
flag_he1 == 1) ) ) /* Speech present */
(
   flag = 1;
   flag_dtx=1;
   if ( snr_sum > thr1 )
   (
      *localVAD =1;   /* VAD without hangover */
   )
   st->nb_active_frames++;   /* Counter of consecutive active speech
frames */
   if ( st->nb_active_frames >= ACTIVE_FRAMES )
   (
      st->nb_active_frames = ACTIVE_FRAMES;
      st->hangover_cnt = 0;   /* Reset the counter of hangover frames
after at least "active_frames" speech frames */
   )
   if (st->Opt_DTX_ON)
   (
         if (st->vad_flag_cnt 50 > 45 ) /* 45 requires roughtly > 90%
flag activity */
         (
            /* If sufficient activity during last second add hangover
               with out requirement for active frames
            */
            st->hangover_cnt_dtx=0;
         )
   )
```

-continued

```
    /* inside HO period */
    if( st->hangover_cnt < HANGOVER_LONG && st->hangover_cnt != 0 )
    (
        st->hangover_cnt++;
    )
    if( st->hangover_cnt_dtx < HANGOVER_LONG && st->hangover_cnt_dtx
!= 0 )
    (
        st->hangover_cnt_dtx++;
    )
)
else
( /* Reset the counter of speech frames necessary to start hangover
algorithm */
    st->nb_active_frames = 0;
    if( st->hangover_cnt < HANGOVER_LONG )   /* inside HO period */
    (
        st->hangover_cnt++;
    )
    if( st->hangover_cnt <= hangover_short )   /* "hard" hangover */
    (
        flag = 1 ;
        flag_dtx = 1 ;
    )
    if( st->hangover_cnt_dtx < HANGOVER_LONG )   /* inside HO period
*/
    (
        st->hangover_cnt_dtx++;
    )
    if( st->hangover_cnt_dtx <= hangover_short_dtx )   /* "hard"
hangover */
    (
        flag_dtx = 1;
    )
```

With the use of the features short term activity of the primary decision and the long term activity of the final decision it is possible to add extra hangover more specifically within speech bursts and at the end of speech burst, and thereby reducing the amount of speech clipping, in particular for high efficient VADs.

The long term activity of final decision also makes it possible to add hangover to short bursts after longer utterances, which reduces the risk of back end clipping of unvoiced explosives.

With the use of the activity features, it becomes possible to extend the hangover on segments with already high speech activity. This allows for longer extension without risking that the overall activity would increase dramatically.

With additional features, as presented further above, further refinement is possible which makes the hangover extension possible even in more limited conditions, such as low speech level.

With a more aggressive SAD it might be easier to remove any speech clipping by adding some extended hangover, in particularly if it can be done more specifically for already high activity segments. This solution might be easier to tune than trying to retune a solution which is based on several SAD's working in parallel.

The embodiments described above are to be understood as a few illustrative examples of the present ideas. It will be understood by those skilled in the art that various modifications, combinations and changes may be made to the embodiments without departing from the general scope of the present embodiments. In particular, different part solutions in the different embodiments can be combined in other configurations, where technically possible.

The invention claimed is:

1. A method for voice activity detection (VAD), the method comprising:

creating a signal indicative of a primary VAD decision;

determining whether a hangover addition of the primary VAD decision is to be performed;

creating a signal indicative of a final VAD decision at least partly depending on a hangover addition determination;

wherein determining hangover addition is based on a short term activity measure and a long term activity measure, wherein the long term activity measure is deduced from N_lt latest primary VAD decisions or from N_lt latest final VAD decisions.

2. The method according to claim 1, wherein the short term activity measure is deduced from N_st latest primary VAD decisions.

3. The method according to claim 2, wherein N_lt is larger than N_st.

4. The method according to claim 2, wherein the short term activity measure is based on a number of active frames in a memory of latest primary VAD decisions.

5. The method according to claim 1, wherein creating the signal indicative of the final VAD decision comprises creating two versions of final decisions, a first final VAD decision and a second final VAD decision.

6. The method according to claim 5, wherein the second final VAD decision is made without use of the short term activity measure or the long term activity measure.

7. The method according to claim 5, wherein the long term activity measure is deduced from N_lt latest second final VAD decisions.

8. The method according to claim 5, wherein the first final VAD decision corresponds to vad_flag_dtx and the second final VAD decision corresponds to vad_flag.

9. The method according to claim 1, wherein the long term activity measure is based on a number of active frames in a memory of latest final VAD decisions or in a memory of latest primary VAD decisions.

10. The method according to claim 1, comprising adding a predetermined number of hangover frames if the short term activity measure reaches a first predetermined threshold and the long term activity measure reaches a second predetermined threshold.

11. The method according to claim 1, wherein the final VAD decision is equal to a voice activity decision if the hangover addition is determined to be performed.

12. The method according to claim 1, wherein the final VAD decision is equal to the primary VAD decision if the hangover addition is determined not to be performed.

13. An apparatus for voice activity detection (VAD), the apparatus comprising:

an input section for receiving an input signal;

a primary voice detector arrangement, connected to the input section, configured for detecting voice activity in the received input signal and for creating a signal indicative of a primary VAD decision associated with the received input signal;

a hangover addition unit, connected to the primary voice detector arrangement, configured for determining whether a hangover addition of the primary VAD decision is to be performed, and for creating a signal indicative of a final VAD decision at least partly depending on a hangover addition determination; and at least one of:

a short term activity estimator connected to an input of the hangover addition unit, and a long term activity estimator connected to an output of the hangover addition unit, wherein the long term activity estimator is configured for deducing a long term activity measure from N_lt latest primary VAD decisions or from N_lt latest final VAD decisions;

wherein the hangover addition unit is further connected to an output of the short term activity estimator and the long term activity estimator, and configured for performing the hangover determination in dependence of a short term activity measure and the long term activity measure.

14. The apparatus according to claim 13, wherein the short term activity estimator is configured for deducing a short term activity measure from N_st latest primary VAD decisions.

15. The apparatus according to claim 13, wherein the hangover addition unit is configured to create two versions of final decisions, a first final VAD decision and a second final VAD decision.

16. The apparatus according to claim 15, wherein the second final VAD decision is made without use of the short term activity measure or the long term activity measure.

17. The apparatus according to claim 15, wherein the long term activity estimator is configured for deducing a long term activity measure from N_lt latest second final VAD decisions.

18. The apparatus according to claim 13, comprising a memory of primary VAD decisions and final VAD decisions, the apparatus further comprising counters of active frames in said memory of primary VAD decisions and final VAD decisions.

19. The apparatus according to claim 13, wherein the hangover addition unit is further configured to add a predetermined number of hangover frames if the short term activity measure reaches a first predetermined threshold and the long term activity measure reaches a second predetermined threshold.

20. The apparatus according to claim 13, wherein the final VAD decision is equal to a voice activity decision if the hangover addition is determined to be performed and the final VAD decision is equal to the primary VAD decision if the hangover addition is determined not to be performed.

21. A codec for encoding voice or sound, said codec comprising the apparatus according to claim 13.

22. An apparatus comprising:

a processor; and a memory storing software components, wherein the processor is configured to execute:

software component for creating a signal indicative of a primary VAD decision;

a software component for determining whether a hangover addition of the primary VAD decision is to be performed;

a software component for creating a signal indicative of a final VAD decision at least partly depending on a hangover addition determination;

a software component for deducing a short term activity measure from N_st latest primary VAD decisions and a software component for deducing a long term activity measure from N_lt latest final VAD decisions.

* * * * *